Aug. 7, 1962 R. E. PLUMP ET AL 3,048,648
ELECTRICAL APPARATUS AND GASEOUS DIELECTRIC MATERIAL
THEREFOR COMPRISING PERFLUOROALKYLNITRILE
Filed Aug. 25, 1959 2 Sheets-Sheet 1

Inventors,
Ralph E. Plump,
John C. Devins,
by Sidney Greenberg
Their Attorney.

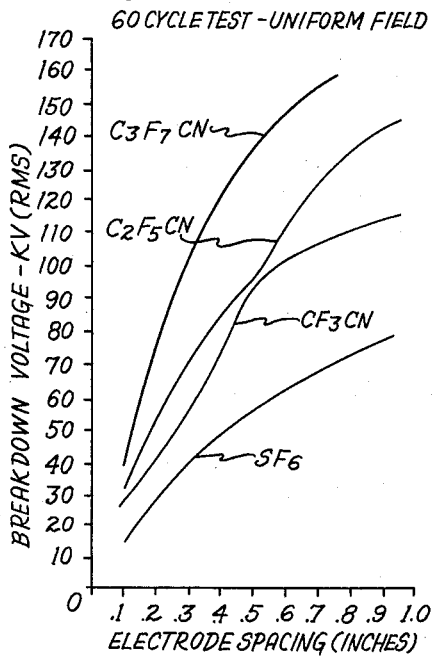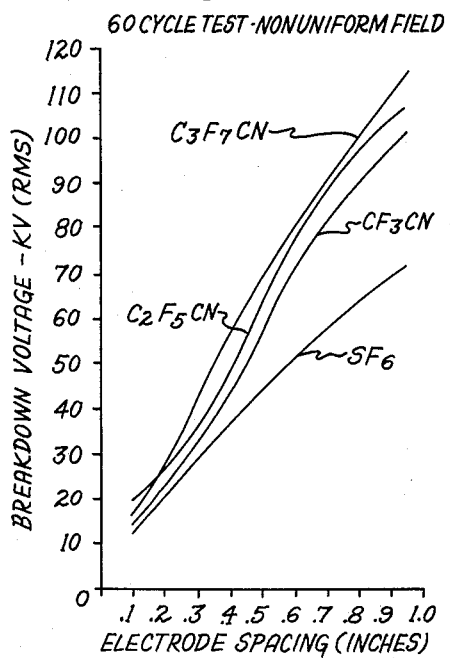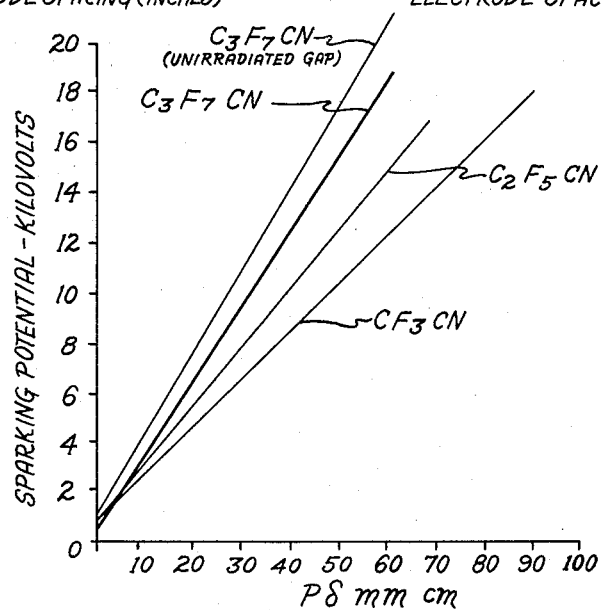

3,048,648
ELECTRICAL APPARATUS AND GASEOUS DI-
ELECTRIC MATERIAL THEREFOR COMPRISING
PERFLUOROALKYLNITRILE
Ralph E. Plump, Pittsfield, Mass., and John C. Devins, Scotia, N.Y., assignors to General Electric Company, a corporation of New York
Filed Aug. 25, 1959, Ser. No. 835,990
2 Claims. (Cl. 174—17)

The present invention relates to dielectric material, and more particularly to gaseous electrical insulating material and electrical apparatus utilizing the same.

The use of gaseous dielectric media for electrical apparatus, particularly in high voltage transformers of commercial power frequency types, has been found preferable in many cases to liquid dielectrics, which are in some cases inflammable or subject to degradation of their insulating characteristics by oxidation effects and various contaminants. Of the two types of insulation, gases possess an advantage over liquids in that less weight of material need be employed in the system, and consequently the overall weight of electrical apparatus utilizing gaseous dielectrics is substantially less. Also, in the case of internal failures, the chance of explosion is considerably reduced because of the compressibility of gases. Other advantages are that gaseous dielectrics are not flammable, reduce the transmission of sound, have better heat transfer properties, and require less power consumption in forced circulation of the dielectric for cooling purposes due to lower viscosity and density.

Various gaseous compounds have previously been suggested for use as transformer dielectrics, such as sulfur hexafluoride, and halogen-combined hydrocarbons. The previously used gaseous dielectrics have, however, been subject to various disadvantages, as for example, thermal degradation at elevated temperature, insufficient dielectric strength especially at high voltages and high temperature, having boiling points which are too high to insure adequate insulation protection at low temperatures, and being unduly corrosive of metallic parts of the electrical apparatus with which they come into contact.

It is an object of the present invention to provide electrical apparatus, such as transformers, capacitors, switchgear, cables and the like and gaseous dielectric material therefor, which overcomes the above-mentioned disadvantages of the prior art gaseous dielectric materials.

It is another object of the invention to provide a gaseous dielectric medium for use with electrical apparatus of the above type which possesses improved dielectric strength both in uniform and non-uniform electrical fields, adequate thermal stability, non-corrosive qualities, and good arc extinguishing properties.

As used herein, a "non-uniform field" means an electrical (electrostatic) field between two electrodes wherein there is a non-uniform or non-proportional distribution of the electrical potential in the space between the two electrodes, as distinguished from a "uniform field" where the potential distribution is proportional with the spacing between the electrodes.

In accordance with the invention there is provided for use in electrical apparatus having an electrical device within a closed container a gaseous insulating medium between conducting parts of different electrical potential which comprises a perhalonitrile, and more particularly a member of the group of perfluoro-n-alkylnitriles or mixtures of such materials. Specific compounds within this group which have been found particularly satisfactory in practicing the invention are the lower molecular weight perfluoroalkylnitriles, viz., perfluoroacetonitrile $$(CF_3CN)$$

perfluoropropionitrile ($C_2F_5CN$), and perfluorobutyronitrile ($C_3F_7CN$). These compounds may be designated generally by the formula $C_nF_{2n+1}CN$, wherein $n$ is an integer from 1 to 3.

The invention will be better understood from the following decription taken in conjunction with the accompanying drawings, in which:

FIGURE 5 is a graph illustrating the comparative results of a 60-cycle electrical breakdown test in a uniform field;

FIGURE 6 is a graph similarly showing the comparative results of a 60-cycle test on the gases in a non-uniform electrical field; and FIGURE 7 graphically illustrates further the electrical properties of the present gaseous dielectric materials in a D.C. field.

Figure 1:
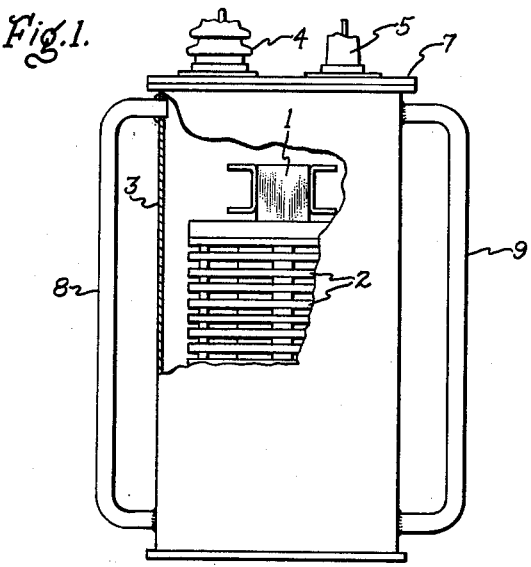
FIGURE 1 is a view partly in section, schematically illustrating a dry-type transformer adapted to contain a gaseous insulation material in accordance with the invention.

Shown in FIGURE 1 is a transformer having a core 1 on which are wound a plurality of inductively-related electrical windings 2 in accordance with conventional transformer construction. The core 1 and windings 2 are immersed in the gaseous dielectric material of the present invention which is contained within the tank 3 of the transformer. The gas-tight housing 3 is fitted with a removable cover 7 which is provided with a pair of bushings 4 and 5 through which the external terminals extend. Also provided on the transformer are cooling conduits 8 and 9 through which the gas circulates, the gas dielectric being circulated by a pump (not shown) in accordance with known construction. The transformer may also contain means for removing corrosive products in case of accidental arcing in the gas, e.g., a granular absorbent such as alumina, soda lime, or other material.

Figure 2:
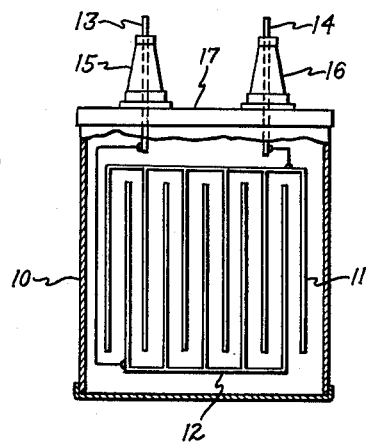
FIGURE 2 illustrates a capacitor adapted to incorporate the present gaseous dielectric medium.

FIGURE 2 illustrates a capacitor which may incorporate the present gaseous electrical insulating material. The capacitor, as conventionally shown in FIGURE 2, comprises a casing 10 in which are mounted spaced armatures 11 and 12 suitably supported within the casing. The armatures may be maintained in proper operative relative by spacers (not shown) comprising suitable insulating material. The respective spaced sets of capacitor plates are connected to external terminals 13 and 14 which are provided with insulators or bushings 15, 16. Within the capacitor casing 10, a dielectric material comprising the present gaseous material fills the interior space.

It will be understood that the advantages of the present invention are not confined to the electrical devices illustrated but may be obtained in other electrical apparatus, e.g., X-ray tube housings, switchgear, bushings, and gas-filled cables.

Figure 3:
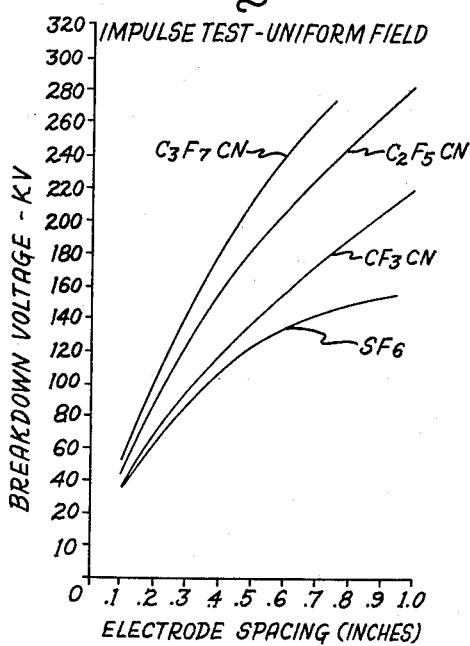
FIGURE 3 is a graph illustrating the electrical impulse characteristics in a uniform field of the present gaseous dielectric media as compared to a known insulating gas.

The graphs of FIGURES 3 to 6 illustrate the breakdown strength of the gaseous dielectric materials of the present invention as compared to sulfur hexafluoride, which is a commonly used gaseous dielectric for electrical apparatus. In the impulse tests illustrated by FIGURES 3 and 4, the gaseous dielectric was subjected to an electrical impulse wave of positive polarity nominally having a crest value of 1½ microseconds and decaying to one-half value at 40 microseconds. In the graph of FIGURE 3 in which the breakdown voltage in kilovolts is plotted against the electrode spacings in inches, there is shown the electrical strength of the four gases $CF_3CN$, $C_2F_5CN$, $C_3F_7CN$ and $SF_6$ under the described impulse conditions and at atmospheric pressure. The FIGURE 3 test was in a uniform field wherein stainless steel spheres of 1 inch diameter were used as the electrodes, the breakdown strength being measured as the voltage at which an electric spark is produced between the electrodes. As shown in the graph, all of the above-mentioned perfluoroalkylnitriles showed a substantially greater breakdown strength than the $SF_6$, especially at the wider electrode spacings.

Figure 4:
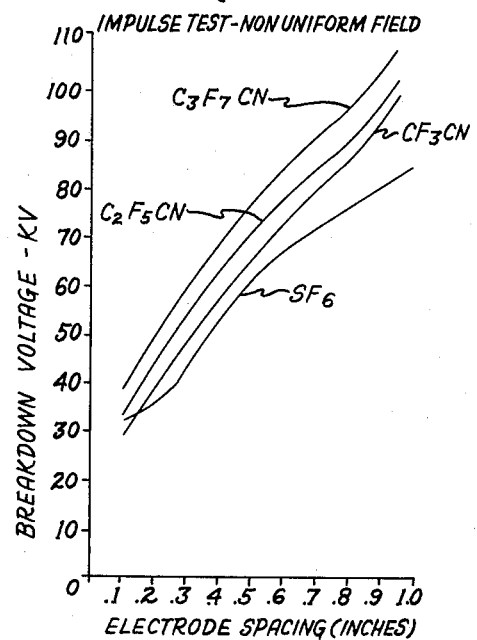
FIGURE 4 is a graph showing a similar test in a non-uniform electrical field.

FIGURE 4 is a graph showing the results of a similar impulse test wherein a non-uniform field was established by the use of a cylindrical tungsten rod of 1/10 inch thickness as one electrode, and a 1 inch diameter stainless steel sphere as the other electrode. As is apparent from the FIGURE 4 graph, the perfluoroalkylnitrile gases were all superior under the non-uniform field conditions to the sulfurhexafluoride.

In the FIGURE 5 graph there is illustrated the breakdown strength of the same gases in a test in which the gases were subjected to a 60 cycle voltage using a rising applied voltage at a rate of ½ kv. per second from 0 voltage until a spark was observed between the electrodes. In the graph the breakdown voltage in kilovolts (root mean square) is plotted against electrode spacing in inches, the test also being conducted in a uniform field at atmospheric pressure. It is evident from this showing that the perfluoroalkylnitriles also had markedly greater resistance to the 60-cycle breakdown stress than the $SF_6$, which has heretofore been commonly used for gaseous insulating purposes at such electrical frequencies.

FIGURE 6 illustrates a similar 60-cycle test conducted, however, in a non-uniform field using the electrodes described in connection with FIGURE 4 above. Here, also, the gases of the present invention showed a marked improvement in the ability to withstand the voltages applied as compared to the electrical strength exhibited by $SF_6$.

The tests described above were carried out under conditions typical of commercial power frequency transformers and other electrical apparatus wherein both uniform and non-uniform fields exist. A uniform electrical field may be found, for example, in the turn-to-turn windings in the transformer coil, whereas non-uniform field conditions may be found in the area of the terminals or other angular structures in the interior of the transformer. It is evident, however, that under either condition the perfluoroalkylnitriles of the present invention exhibit considerably greater electrical strength than the prior known gaseous dielectric material. An advantage afforded by such greater electrical strength is the possibility afforded of making transformers and other electrical apparatus more compact, since it enables a reduction in the space occupied by insulation between parts of unequal electrical potential. Consequently, in addition to the lighter weight afforded by the use of a gas as mentioned above, the further benefit of providing electrical apparatus of less bulk for equivalent capacity may be realized by the use of the described gaseous dielectric material.

FIGURE 7 shows curves relating the D.C. breakdown voltage of $CF_3CN$, $C_2F_5CN$ and $C_3F_7CN$ in a uniform field gap to pressure, P, and electrode separation ($\delta$). In order to insure adequate reproducibility and accurate comparisons among gases, the gaps were irradiated with ultraviolet light (except in the one case labelled "unirradiated gap"). The pressure used ranged from about 200 to 650 mm. Hg, and the results indicate that over the range investigated, the breakdown voltages obeyed Paschen's law, i.e. they were a function of the product of pressure and electrode separation, $P\delta$, as shown in FIGURE 7. The decrease in electric strength of gases under the influence of the ultraviolet irradiation is often observed, but it is noteworthy that the actual decrease exemplified by $C_3F_7CN$ is not large as compared to other gases.

Using the data of FIGURE 7, and similar measurements in nitrogen, we have established that $CF_3CN$, $C_2F_5CN$ and $C_3F_7CN$ have, respectively, 2.7, 3.5 and 4.6 times the electrical strength of nitrogen. These ratios again substantiate the superiority of this series of gaseous compounds over other dielectric gases such as $SF_6$ which, under the conditions used in these experiments, was found to have 1.8 times the strength of nitrogen. These results show good performance of our dielectric gases under D.C. field conditions.

In addition to the high dielectric strength properties exhibited by the present gases, certain of these gases are characterized by very low boiling points. $CF_3CN$ is particularly noteworthy in this respect, having a boiling point of about −63° C. $C_2F_5CN$ has a boiling point of about −35° C., and $C_3F_7CN$ has a boiling point of about 1° C. It will be observed from the data shown in the drawings that $C_3F_7CN$, has the greatest dielectric strength as compared to the other two gases. However, in view of the better low temperature properties of $CF_3CN$, it is of advantage, where both high strength and low temperature characteristics are desired, to combine two or more of the gases in the appropriate proportions to achieve the results sought. At −40° C., for example, the vapor pressure of $C_3F_7CN$ is estimated to be about 2 p.s.i.a. and this represents a quantity of gas sufficient to make an appreciable contribution to the total electrical strength of a gas mixture comprising, for example, $CF_3CN$ and $C_3F_7CN$. Similarly, the vapor pressure of $C_2F_5CN$ at −40° C. is estimated to be a little less than one atmosphere absolute, and it is obvious from Raoult's law calculations that one atmosphere of $CF_3CN$ added to the $C_2F_5CN$ at −40° C. will provide a mixture exerting a pressure of more than 1.5 atmospheres and having excellent electrical strength. However, where an extremely low boiling point material with adequate dielectric strength is desired, the use of $CF_3CN$ alone is indicated. On the other hand, if the highest dielectric strength is desired under conditions where extremely low temperatures are not to be encountered the use of $C_3F_7CN$ alone would be appropriate.

A significant feature of the present invention is the specifically reactive nature of the disclosed gases for addition-type reactions. The structures of the perfluoronitriles involve a triple bond between the C and N in the nitrile group, showing them to be highly unsaturated compounds, and as such they afford reactivity toward free radicals and ions, such as F and F-containing groups, and other degradation products which may be present in a fluorocarbon gas atmosphere.

It should be noted that although fluorocarbon gases as a class are electronegative in character, it has been found that this feature alone does not determine their high dielectric strength. Other characteristics present in each specific fluorocarbon gas appear to play an important part. Thus, even though electrons may not attach on collision with molecules, and in this manner be prevented from leading to further ionization, they may lose an appreciable fraction of their energy, so that a higher electrical field must be applied to ensure the degree of ionization required for breakdown. The molecular characteristics of each specific gas will determine the relative importance of each of these processes and thus, in a complicated manner, the electric strength of the gas. It appears that the triple bond in the perfluoronitriles may provide large energy losses from the electrons, while the electronegative properties of the fluorinated molecule, as a whole, provides appreciable amounts of attachment, or electron trapping. These molecules, therefore, take advantage of both processes which lead to higher electric strength.

Considering the fact that most of the high electrical strength gases heretofore found useful for dielectric purposes have been non-polar, such as $SF_6$, $C_3F_8$, $C_4F_{10}$ and others, the excellent dielectric properties of the perfluoroalkylnitriles, which are polar compounds, were rather unexpected.

In general, in the use of the disclosed gases as dielectric media it has been found desirable to ensure that the gases are dry and that the apparatus is dry in order to avoid undesirable reaction of the gas with water.

Beneficial results may be afforded by mixtures of the disclosed perfluoroalkylnitriles with other types of dielectric gases such as sulfurhexafluoride or other known fluoro-gases. The invention, therefore, is not intended to be limited to the use solely of the disclosed perfluoroalkylnitriles, because various other advantages, such as greater economy, variation in boiling point and added pressure may be afforded by the combination therewith of such other gases.

The gaseous dielectric materials of the present invention may, specifically, be mixed with nitrogen gas, if desired, particularly under non-uniform field conditions, wherein such further mixtures will provide an even higher dielectric strength especially at elevated pressure or large gap spacing, in accordance with the principles expressed in U.S. Patent 2,853,540—Camilli et al., issued September 23, 1958 and assigned to the same assignee as the present application.

In addition to the observed high dielectric strength of the perfluoronitriles, there are indications that the arc recovery strength of these gases is exceptionally good. For example, in a test comparing $CF_3CN$ and $SF_6$ in their ability to prevent the re-striking of an arc at a peak current of 400 amperes with a 1/8 inch gap at one atmosphere pressure, it was found that, 10 microseconds after the first arc had been extinguished, $CF_3CN$ was able to withstand a voltage of about 1000 volts as compared to about 600 volts for $SF_6$, before permitting the arc to re-strike.

The perfluoronitrile gaseous dielectrics have been tested for corrosion effects on metals of the type frequently used in electrical apparatus. When the $CF_3CN$, $C_2F_5CN$, and $C_3F_7CN$ were aged at a temperature of 225–235° C. in the presence of silicon (core) steel, copper, and aluminum, no appreciable corosion of any of the metals was observed after more than five months of exposure of the metals to these gases. These results showed a marked improvement over the effects of other known dielectric gases such as $SF_6$, which have produced substantially greater tarnishing and other corrosion effects on copper and steel under like conditions.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical apparatus comprising, in combination, a closed container and an electrical device within said container including spaced conducting parts which during operation are at unequal potential, and a gaseous electrical insulating medium in said container between said parts containing as an essential ingredient a perfluoroalkylnitrile having the formula $C_nF_{2n+1}CN$, in which $n$ is an integer from 1 to 3.

2. An electrical apparatus comprising, in combination, a closed container and an electrical device within said container including spaced conducting parts which during operation are at unequal potential, and a gaseous electrical insulating medium in said container between said parts containing as an essential ingredient a perfluoroalkylnitrile selected from the group consisting of $CF_3CN$, $C_2F_5CN$, and $C_3F_7CN$, and mixtures thereof.

References Cited in the file of this patent

UNITED STATES PATENTS

| 2,671,799 | Miller | Mar. 9, 1954 |
| 2,845,472 | Narbut | July 29, 1958 |

FOREIGN PATENTS

| 167,689 | Australia | May 15, 1956 |

OTHER REFERENCES

Lovelace et al.: Aliphatic Fluoride Compounds, Reinhold Pub. Corp., N.Y., 1958, pp. 265–279.